United States Patent Office 2,867,616
Patented Jan. 6, 1959

2,867,616

7-DEHYDRO DIOSGENIN COMPOUNDS AND PROCESS FOR MAKING SAME

George Rosenkranz and Jesús Romo, Mexico City, Mexico, assignors to Syntex S. A., Mexico City, Mexico, a corporation of Mexico No Drawing. Application October 24, 1950
Serial No. 191,941

Claims priority, application Mexico May 17, 1950

15 Claims. (Cl. 260—239.55)

The present invention relates to cyclopentanophenanthrene derivatives and process for producing the same.

More particularly the present invention relates to novel steroidal sapogenin derivatives provided with a spiro-ketal side chain and further characterized by a 3-hydroxy $\Delta^{5,7}$-diene grouping in rings A and B of the cyclopentanophenanthrene nucleus. The novel derivatives just set forth are important intermediates for the manufacture of synthetic hormones and further possess a grouping similar to that present in pro-vitamin D so that they may be irradiated to produce compounds chemically analogous to materials having possible antirachitic activity.

It has previously been known to treat various sapogenins with brominating reagents including N-bromosuccinimide in suitable solution, such as carbon tetrachloride. However, the spiro-ketal side chain of the sapogenins easily reacts with these brominating reagents and the resultant compounds are the twenty-three bromosapogenins, which, as such, do not have practical application.

In accordance with the present invention, however, the surprising discovery has been made that when sapogenins of the character more fully described hereinafter are reacted with N-bromosuccinimide in the presence of a suitable solvent and strongly illuminated with artificial light, a selective bromination takes place to brominate the sapogenin in the 7-position while avoiding the simultaneous bromination in position 23. It has been further discovered that the 7-bromo-derivatives thus produced may be easily dehydrobrominated by refluxing these derivatives for a short period with a tertiary amine so as to produce the corresponding $\Delta^{5,7}$-sapogenin derivative.

The following equations illustrate in general the process according to the present invention:

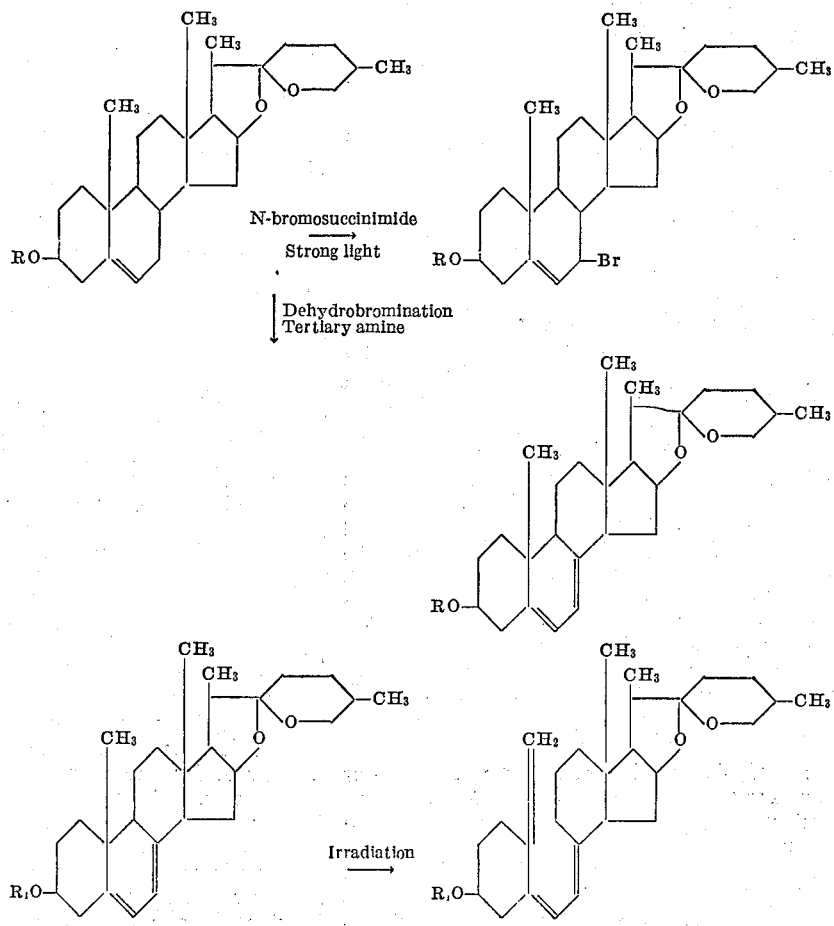

In the above equation R may be the residue of a suitable fatty acid, as for example a lower fatty acid such as acetic or propionic, or R may be the residue of an aromatic acid such as benzoic. $R_1$ may be either hydrogen or any of the acid residues described for R.

Although in the above equations the process according to the present invention has been illustrated as applied to the 22-iso compounds, the present process is also applicable to the 22 normal compounds. The starting materials may also be otherwise substituted in the ring in the manner characteristic of the naturally occurring sapogenins.

In practicing the process of the present invention, a steroidal sapogenin having the $\Delta^5$-3-hydroxy grouping as well as the spiro-ketal structure at 16,17, as for example, diosgenin, yuccagenin, botogenin, yamogenin, kamogenin, pennogenin or other similar compounds may be used.

The sapogenin is dissolved in a suitable solvent, as for example carbon tetrachloride and preferably a portion of the solvent is distilled to completely remove any moisture. Thereafter the N-bromosuccinimide is added and the mixture is heated to boiling by the use of a strong electric lamp. Preferably a second lamp is utilized to increase the illumination. After a short period of reflux the formed succinimide floats to the surface and the mixture can then be cooled and filtered to remove the succinimide formed. The succinimide is then washed with ether and the washings are added to the main fraction. The organic solvent solution of the product is washed in a separatory funnel with water, separated and then dried with anhydrous sodium sulfate, decolorized with charcoal, filtered and evaporated to dryness to produce, after crystallization from a suitable solvent, such as ether, the desired 7-bromo steroidal sapogenin.

The 7-bromo steroidal sapogenin produced, as just before indicated, can be dehydrobrominated by refluxing the same for a short time with a tertiary amine, as for example dimethyl aniline, pyridine or collidine. Preferably, however, the dehydrobromination is effected by refluxing with collidine in the presence of a suitable solvent, as for example xylene. After refluxing for a short period of time, as for example 90 minutes, the mixture is cooled and the formed collidine hydrobromide is filtered and washed with ether which is combined with the main fraction. If the collidine hydrobromide does not represent a sufficient proportion, as for example 90% of the theoretical quantity, the refluxing is continued for another period of time, as for example thirty minutes. The combined fractions, i. e. the main fraction and the ether washing of the hydrobromide, are washed with dilute sulfuric acid to remove the excess collidine, then with water and finally dried with anhydrous sodium sulfate. The ether is then distilled off and the xylene is then steam distilled. The remaining brown precipitate is filtered, stirred twice with a suitable solvent, such as methanol, and crystallized from a suitable solvent to produce the corresponding 7-dehydro, i. e. $\Delta^{5,7}$-steroid sapogenin derivative. The esters thus produced may be saponified with alcoholic alkali to prepare the corresponding 3-hydroxy compounds. The $\Delta^{5,7}$ compounds thus produced may be then irradiated in a conventional manner as indicated by the equation previously set forth.

The following specific examples serve to illustrate but are not intended to limit the present invention:

Example I

Preparation of 7-bromo diosgenin acetate: 13.65 grams of diosgenin acetate were dissolved in 105 cc. of carbon tetrachloride and 30 cc. were distilled to remove completely any moisture. 6.3 grams of bromosuccinimide was then added and the mixture was heated to boiling by the use of an electric lamp, which at the same time illuminated strongly the reaction mixture. To increase illumination an additional lamp was used. After four or five minutes of reflux the precipitate was floating on the surface and reaction was considered as complete. The mixture was cooled and filtered to remove the succinimide formed during the reaction. This was washed with ether and the ether was added to the main fraction. The organic layer was washed in a separatory funnel with water, dried with anhydrous sodium sulfate, decolorized with charcoal, filtered and evaporated to dryness under reduced pressure. The residue was crystallized from ether, yielding 8.5 grams of 7-bromo diosgenin acetate with melting point 165–167° C., $(\alpha)_D^{20} = -303°$ in chloroform.

Example II

Preparation of $\Delta^7$-dehydro diosgenin acetate: 5.26 grams of the bromo derivative of Example I were dissolved in a mixture of 21 cc. of collidine and 210 cc. of xylene; the mixture was refluxed for 90 minutes, then cooled and the collidine hydrobromide was filtered and washed with ether. The ether wash was separated and saved. The collidine hydrobromide was weighed and if not equivalent to at least 90% of the theoretical quantity refluxing was continued for thirty minutes. The ether wash was combined with the main fraction and washed with dilute sulfuric acid to remove completely the excess collidine, then with water and dried with anhydrous sodium sulfate. The ether was distilled and then the xylene was steam distilled. The remaining brown precipitate was filtered, stirred twice with methanol and crystallized from pentane yielding 2.4 grams of needles of $\Delta^7$-dehydro diosgenin acetate, melting point 195.5–198° C., $(\alpha)_D^{20} = -127°$ in chloroform.

Example III

Preparation of $\Delta^7$-dehydro diosgenin: 5 grams of $\Delta^7$-dehydro diosgenin acetate of Example II were saponified by refluxing with 100 cc. of 1% alcoholic potassium hydroxide solution, under nitrogen atmosphere. After one hour the mixture was poured into water and the precipitate was extracted with ether. The ether solution was washed neutral with water, dried over anhydrous sodium sulfate and evaporated to dryness. The residue was crystallized from hexane, yielding 4.7 grams of needles of $\Delta^7$-dehydro diosgenin, melting point 180–184° C., $(\alpha)_D^{20} = -160°$ in chloroform.

Example IV

Preparation of $\Delta^7$-dehydro diosgenin benzoate: 1 gram of $\Delta^7$-dehydro diosgenin of Example III was dissolved in 5 cc. of anhydrous pyridine and 3 cc. of benzoyl chloride were added. The mixture was left standing at room temperature for 24 hours, then poured into water. The oily precipitate was extracted with chloroform and the extract was washed with dilute hydrochloric acid and sodium carbonate, and then with water until neutral, dried with anhydrous sodium sulfate and evaporated to dryness. Upon addition of methanol, one gram of white needles of $\Delta^7$-dehydro diosgenin benzoate, melting point 203–204° C., was obtained.

By recrystallization from ethyl acetate-methanol needles of melting point 206–209° C., $(\alpha)_D^{20} = -91°$ in chloroform were obtained.

Example V $\Delta^7$-dehydro diosgenin p-nitro benzoate: 1 gram of $\Delta^7$-dehydro diosgenin of Example III was dissolved in 5 cc. of anhydrous pyridine and one grame of p-nitro benzoyl chloride was added. The mixture was heated on a steam bath during one hour, then poured into water. The resulting crystalline product was filtered, washed with water, dissolved in chloroform and shaken with two portions of 5% sodium carbonate solution to remove the p-nitro benzoic acid formed in the reaction. It was washed with water until neutral and dried with sodium sulfate. The chloroform solution was concentrated. On diluting the solution with methanol, 1.2 grams of lemon yellow needles of $\Delta^7$-dehydro diosgenin p-nitro benzoate of melting point 221–223° C. were obtained. Recrystallization from chloroform-methanol raised the melting point to 223° C., $(\alpha)_D^{20} = -93.5°$ in chloroform.

*Example VI*

$\Delta^7$-dehydro diosgenin 3,5-dinitro benzoate: 1 gram of $\Delta^7$-dehydro diosgenin of Example III was dissolved in 5 cc. of anhydrous pyridine and 1 gram of freshly prepared 3,5-dinitro benzoyl chloride was added. Working as described in the previous example, crystallization from chloroform-methanol yielded yellow needles of $\Delta^7$-dehydo diosgenin 3,5-dinitro benzoate, melting point 223–225° C., $(\alpha)_D^{20} = -89.6°$ in chloroform.

We claim:

1. A process for the production of 7-bromo steroidal sapogenin esters having a $\Delta^5$-3-hydroxy grouping and a spiro-ketal side chain in positions 16 and 17, which comprises reacting a corresponding ester of the steroidal sapogenin with N-bromosuccinimide while dissolved in an inert organic solvent and subjected to artificial illumination.

2. The method of claim 1 wherein the sapogenin is diosgenin acetate and the product is 7-bromo diosgenin acetate.

3. The method of claim 1 wherein the sapogenin is the yamogenin acetate and the product produced is 7-bromo yamogenin acetate.

4. A method for the preparation of a $\Delta^{5,7}$-ester of a steroidal sapogenin having a 3-hydroxy group and a spiro-ketal side chain in positions 16 and 17, which comprises reacting a corresponding ester of the steroidal sapogenin with N-bromosuccinimide while dissolved in an inert organic solvent and subjected to artificial illumination to form the corresponding 7-bromo steroidal sapogenin ester and thereafter dehydrobrominating said 7-bromo compound by reaction with a tertiary amine.

5. The method of claim 4 wherein the tertiary amine is collidine and the reaction therewith takes place in the presence of xylene.

6. The method of claim 4 wherein the sapogenin is diosgenin acetate and the product is $\Delta^7$-dehydro diosgenin acetate.

7. The method of claim 4 wherein the sapogenin is yamogenin acetate and the product produced is $\Delta^7$-dehydro yamogenin acetate.

8. A new compound comprising $\Delta^7$-dehydro diosgenin acetate having a melting point of 195.5–198° C.

9. A new compound comprising $\Delta^7$-dehydro diosgenin having a melting point of 180–184° C.

10. A new compound comprising $\Delta^7$-dehydro diosgenin benzoate having a melting point of 206–209° C.

11. A new compound selected from the group consisting of $\Delta^7$-dehydo diosgenin, the lower fatty acid esters of $\Delta^7$-dehydro diosgenin and the benzoic acid ester of $\Delta^7$-dehydro diosgenin.

12. The 3-acyloxy derivatives of 7-bromo-diosgenin in which the acyloxy group is an acid radical of a lower hydrocarbon carboxylic acid.

13. 7-bromo-diosgenin-acetate.

14. 7-bromo-diosgenin-benzoate.

15. The process for preparing a compound selected from the class consisting of lower-alkanoate and benzoate esters of 7-bromodiosgenin which comprises reacting a compound selected from the class consisting of lower-alkanoate and benzoate esters of diosgenin with N-bromosuccinimide in the presence of an inert solvent and artificial illumination.

References Cited in the file of this patent

UNITED STATES PATENTS

| | | |
|---|---|---|
| 2,441,091 | Vliet et al. | May 4, 1948 |
| 2,498,390 | Bernstein et al. | Feb. 21, 1950 |
| 2,500,576 | Ruigh | Mar. 14, 1950 |